US011897754B2

(12) United States Patent
Affan et al.

(10) Patent No.: US 11,897,754 B2
(45) Date of Patent: Feb. 13, 2024

(54) DISPENSING SYSTEM WITH LIQUID LEVEL SENSING AND LEVEL-BASED ACTIONS

(71) Applicant: Henkel AG & Co. KGaA, Duesseldorf (DE)

(72) Inventors: Elif Affan, Stamford, CT (US); Dirck Seynaeve, Kruibeke (BE); Nadezda Chakrova, Kruibeke (BE); Karel Pauwels, Kruibeke (BE); Edward Gilchrest, Oxford, CT (US); Andrew Bell Krystinik, Middlefield, CT (US); Elana Rae Abrams, Oxford, CT (US); Alexander Borgestedt, Oxford, CT (US); Stanley Maurice Katz, Boston, MA (US); Michael Cong Tao, Roxbury Crossing, MA (US); Mark Craig Brannan, Cambridge (GB)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 17/702,385

(22) Filed: Mar. 23, 2022

(65) Prior Publication Data

US 2022/0306446 A1 Sep. 29, 2022

Related U.S. Application Data

(60) Provisional application No. 63/166,652, filed on Mar. 26, 2021.

(51) Int. Cl.
*B67D 3/00* (2006.01)

(52) U.S. Cl.
CPC ......... *B67D 3/0093* (2013.01); *B67D 3/0067* (2013.01); *B67D 3/0077* (2013.01); *B67D 3/0083* (2013.01)

(58) Field of Classification Search
CPC .. B67D 3/0093; B67D 3/0067; B67D 3/0077; B67D 3/0083
See application file for complete search history.

(56) References Cited

U.S. PATENT DOCUMENTS 4,553,702 A * 11/1985 Coffee .................. B05B 7/2486 239/69
7,896,197 B2 * 3/2011 Furey .................... G01F 11/088 222/64

(Continued)

FOREIGN PATENT DOCUMENTS

KR 10-2009-0049915 A 5/2009

OTHER PUBLICATIONS

International Search Report and Written Opinion of the International Searching Authority for International Application No. PCT/US2022/022005, dated Jul. 8, 2022, 9 pages.

*Primary Examiner* — Frederick C Nicolas
(74) *Attorney, Agent, or Firm* — Sterne, Kessler, Goldstein & Fox P.L.L.C.

(57) ABSTRACT

A dispensing system includes a container, a holder, and a signal processing module. The container includes a body configured to store a liquid and a conductive strip coupled to an outer surface of the body. The holder is configured to receive the container. The holder includes an electrical contact configured to contact the conductive strip when the container is received in the holder. The signal processing module is in electrical communication with the electrical contact. The signal processing module is configured to receive signals from the electrical contact to determine a level of liquid within the container body based on the signals when the container is received in the holder.

19 Claims, 8 Drawing Sheets

(56) References Cited

U.S. PATENT DOCUMENTS

| | | | | |
|---|---|---|---|---|
| 10,238,242 | B2 * | 3/2019 | Macleod | B05B 11/1009 |
| 10,373,118 | B1 | 8/2019 | Lefkow et al. | |
| 10,438,276 | B2 | 10/2019 | Godsey et al. | |
| 10,846,780 | B2 | 11/2020 | Lefkow et al. | |
| 10,853,870 | B2 | 12/2020 | Kramer et al. | |
| 10,909,610 | B1 | 2/2021 | Kramer et al. | |
| 11,010,711 | B1 | 5/2021 | Kramer et al. | |
| 11,023,855 | B1 | 6/2021 | Kramer et al. | |
| 11,100,464 | B1 | 8/2021 | Lefkow et al. | |
| 11,137,479 | B1 | 10/2021 | Kramer et al. | |
| 11,144,877 | B2 | 10/2021 | Tineo | |
| 2004/0124988 | A1 | 7/2004 | Eonard et al. | |
| 2015/0090735 | A1 | 4/2015 | Smith et al. | |
| 2017/0135530 | A1 | 5/2017 | Macleod et al. | |
| 2018/0321072 | A1 | 11/2018 | Williams et al. | |
| 2019/0095853 | A1 | 3/2019 | Kaplan | |
| 2021/0072066 | A1 * | 3/2021 | Williams | G01F 23/18 |
| 2021/0072067 | A1 * | 3/2021 | Williams | G01F 23/22 |
| 2021/0146369 | A1 | 5/2021 | Pham et al. | |
| 2021/0341331 | A1 * | 11/2021 | Williams | B67D 3/0029 |

* cited by examiner

DISPENSING SYSTEM WITH LIQUID LEVEL SENSING AND LEVEL-BASED ACTIONS

CROSS-REFERENCE TO RELATED APPLICATION

This application claims the benefit of U.S. Provisional Application No. 63/166,652, filed Mar. 26, 2021, which is incorporated herein in its entirety by reference thereto.

BACKGROUND

The present disclosure relates to devices and methods for determining the level of liquid within a container and taking an action (e.g., notifying a user or ordering a replacement container) based on the liquid level.

BRIEF SUMMARY

Some embodiments disclosed herein are directed to a dispensing system including a container, a holder, and a signal processing module. In some embodiments, the container includes a body configured to store a liquid and a conductive strip coupled to an outer surface of the body. In some embodiments, the holder is configured to receive the container. In some embodiments, the holder includes an electrical contact configured to contact the conductive strip when the container is received in the holder. In some embodiments, the signal processing module is in electrical communication with the electrical contact. In some embodiments, the signal processing module is configured to receive signals from the electrical contact to determine a level of liquid within the container body based on the signals when the container is received in the holder.

In some embodiments, a contact surface of the conductive strip contacts the electrical contact of the holder when the container is received in the holder. In some embodiments, a plane tangent to the outer surface of the container at the contact surface intersects a horizontal plane at an angle of between about 85 degrees and about 87 degrees.

In some embodiments, the holder includes a tap configured to dispense the liquid from the container. In some embodiments, the container includes a tap configured to dispense the liquid from the container.

In some embodiments, the signal processing module is configured to communicate the level of liquid within the container to a user.

In some embodiments, the signal processing module is configured to determine, based on the level of liquid within the container, that a replenish threshold has been satisfied. In some embodiments, the signal processing module is configured to determine that the replenish threshold has been satisfied based on the level of liquid within the container by first determining a volume of liquid remaining in the container.

In some embodiments, the signal processing module is configured to automatically order a replacement container in response to determining that the replenish threshold has been satisfied. In some embodiments, the signal processing module is configured to automatically send a communication to a user device in response to determining that the replenish threshold has been satisfied.

In some embodiments, the signal processing module is configured to determine the level of liquid within the container in response to determining that a dosing event has occurred. In some embodiments, the signal processing module is configured to determine the level of liquid within the container at a regular time interval.

In some embodiments, the conductive strip is integrally formed with a product label coupled to the outer surface of the container. In some embodiments, the conductive strip is disposed under a product label coupled to the outer surface of the container.

Some embodiments disclosed herein are directed to a container having a body configured to store a liquid. In some embodiments, the body includes an outer surface, an upper portion having an upper side wall portion, and a lower portion having a dispensing opening and a lower side wall portion. In some embodiments, the lower side wall portion is disposed at an angle of about 170 degrees to about 179 degrees relative to the upper side wall portion. In some embodiments, a conductive strip is coupled to the outer surface of the body. In some embodiments, an upper portion of the conductive strip is disposed on the upper side wall portion, and a lower portion of the conductive strip is disposed on the lower side wall portion.

In some embodiments, the lower side wall portion is disposed at an angle of about 175 degrees to about 177 degrees relative to the upper side wall portion.

In some embodiments, the upper side wall portion and the lower side wall portion together form a smooth curve. In some embodiments, the conductive strip is coupled to the outer surface of the body along a coupling portion of the body, and the coupling portion of the body forms a smooth curve.

In some embodiments, the dispensing opening is disposed at a front portion of the body, and the lower portion of the body is angled downward from a rear portion of the body toward the front portion of the body and toward the dispensing opening.

Some embodiments disclosed herein are directed to a method of dispensing a liquid, including disposing a container configured to store a liquid onto a holder; determining, by a signal processing module, a level of liquid within the container while the container is disposed on the holder; determining, by the signal processing module, based on the level of liquid within the container, that a replenish threshold has been satisfied; and communicating, by the signal processing module, that the replenish threshold has been satisfied. In some embodiments, a conductive strip coupled to an outer surface of the container contacts an electric contact disposed on the holder.

In some embodiments, communicating that the replenish threshold has been satisfied includes ordering a replacement container. In some embodiments, communicating that the replenish threshold has been satisfied includes sending a notification to a user device.

BRIEF DESCRIPTION OF THE FIGURES

The accompanying drawings, which are incorporated herein and form a part of the specification, illustrate the embodiments and, together with the description, further serve to explain the principles of the embodiments and to enable a person skilled in the relevant art(s) to make and use the embodiments.

DETAILED DESCRIPTION

Some liquids (e.g., laundry detergent, fabric softener, soft soaps, hair products, and cleaning liquids) can be purchased in replaceable containers and used over time. However, some users may be unaware of when the liquid in a replaceable container is running low, or may not want spend time thinking about whether or when to purchase a replacement container (e.g., cartridge, bottle, etc.) of the liquid. Thus, a dispensing system that determines the level of liquid in a container and then notifies a user when the liquid runs low and/or automatically places an order for a new container when the liquid runs low would be desirable.

It would also be desirable for the dispensing system to include features to easily dispense the liquid from the container.

Some embodiments of the present disclosure provide a dispensing system that can be used to determine the level of liquid in a container and then notify a user when the liquid runs low and/or automatically place an order for a replacement container when the liquid runs low.

These and other embodiments are discussed below in more detail with reference to the figures.

Figure 1:
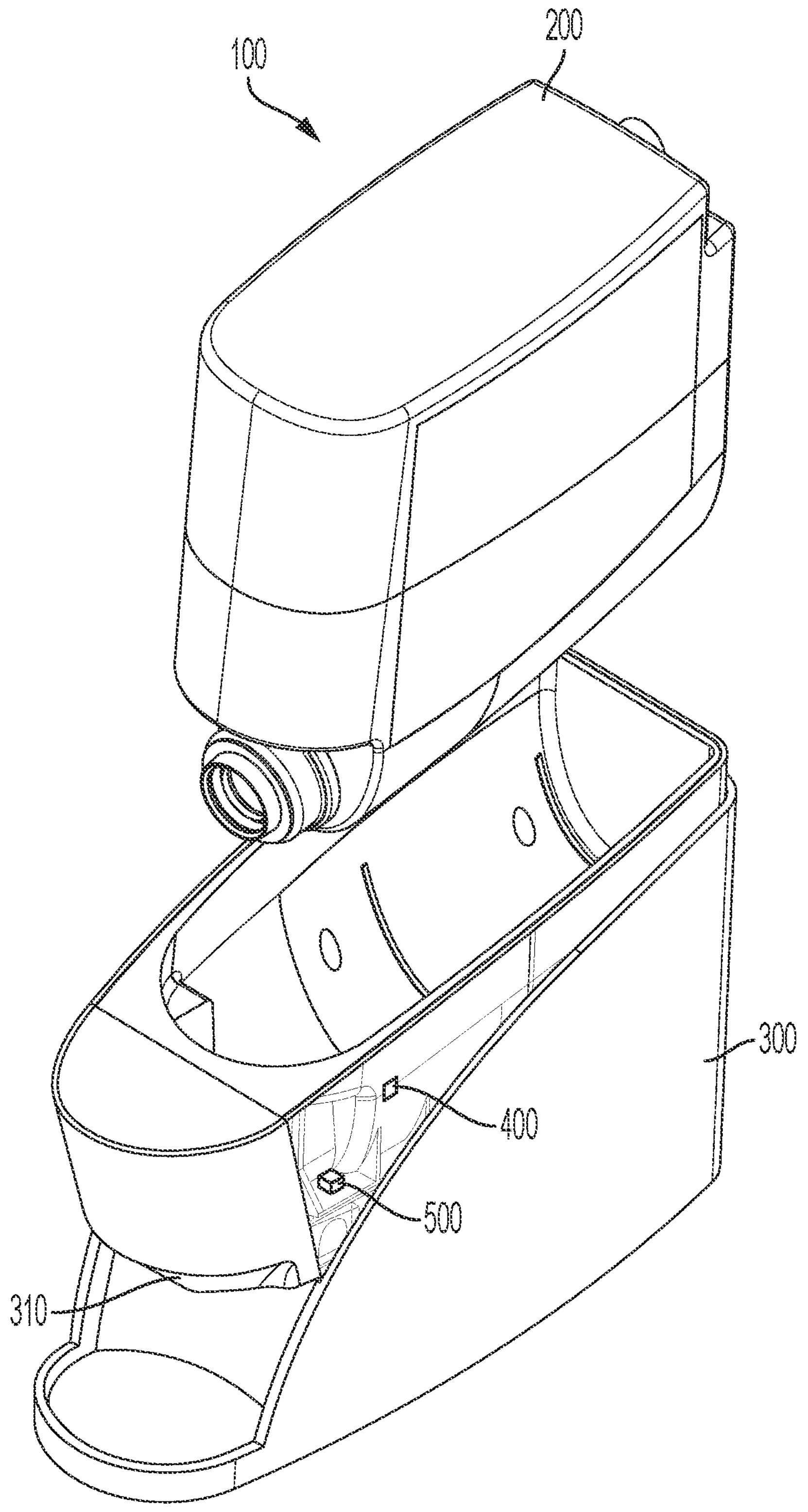
FIG. 1 is a front perspective exploded view of a dispensing system according to some embodiments.

FIG. 1 shows a dispensing system 100 according to some embodiments. Dispensing system 100 can include a container 200 and a holder 300 configured to receive container 200. In some embodiments, container 200 is a replaceable container. In some embodiments, holder 300 is a reusable holder. In some embodiments, container 200 or holder 300 includes a tap 310 for dispensing liquid from container 200.

In some embodiments, dispensing system 100 also includes a sensing system 400 configured to sense an attribute (e.g., weight, volume, or capacitance) of container 200 or its contents, and a signal processing module 500 in electrical communication with sensing system 400. Signal processing module 500 can include sub-modules, including, for example, a power module (e.g. battery, power source connection, etc.), a communications module (e.g., a wireless communications module such as Bluetooth®, WiFi®, etc.), a processing module (e.g., processor, microprocessor, CPU, etc.) and a memory module (e.g., RAM, ROM, EEPROM, etc.). In some embodiments, signal processing module 500 is configured to determine a level of liquid within container 200 based on signals received from sensing system 400 and to notify a user and/or automatically place an order for a replacement container in certain circumstances.

As will be discussed in greater detail, depending on the nature of sensing system 400, sensing system 400 can be part of container 200, part of holder 300, or part of both container 200 and holder 300 (i.e., sensing system 400 can include one or more components that are part of container 200 and one or more components that are part of holder 300).

To use dispensing system 100, a user places container 200 onto holder 300. A user can then dispense a liquid contained within container 200 as desired (e.g., by actuating tap 310, which can be disposed either on holder 300 or container 200).

At periodic intervals (e.g., every 24 hours, every 23 hours, every 8 hours, every 6 hours, or every 1 hour) or in response to a particular event (e.g., a dosing event or user request), signal processing module 500 can determine a level of liquid in container 200 based on sensing data from sensing system 400. Determining a level of liquid in container 200 does not require directly determining the particular volume of liquid within container 200. Rather, for example, determining a level of liquid can include determining a value associated with a volume of liquid in container 200 (e.g., a weight of the liquid or a capacitance of the liquid) or with the presence or absence of liquid in a particular region of container 200 from which calculations can be performed (e.g., by signal processing module 500 based on the volume or weight of the liquid when container 200 is full) to determine the level of liquid in container 200. Signal processing module 500 can then determine, based on the level of liquid within container 200, whether a replenish threshold has been satisfied. If the replenish threshold has been satisfied, signal processing module 500 can send a communication to a user device and/or order a replacement container. If the replenish threshold has not been satisfied, signal processing module 500 can wait a period of time (e.g. a predetermined number of hours or until the next dosing event) before again determining the level of liquid in container 200.

In some embodiments, the signal processing of signal processing module 500 can occur remote from container 200 and/or holder 300. For example, in some embodiments, signal processing module 500 can include a server to determine a level of liquid in container 200 based on sensing data from sensing system 400. In some such embodiments, signal processing module 500 can include a communications submodule to communicate data (e.g., wirelessly) from sensing system 400 to the server. In some such embodiments, the server can determine whether a replenish threshold has been satisfied. In some such embodiments, the server can send a communication to a user device and/or order a replacement container.

In some embodiments in which processing module 500 includes a server, the server can be in communication with multiple holders 300/containers 200. This can, for example, allow server to gather usage data from multiple users to better understand general user behaviors.

Figure 2:
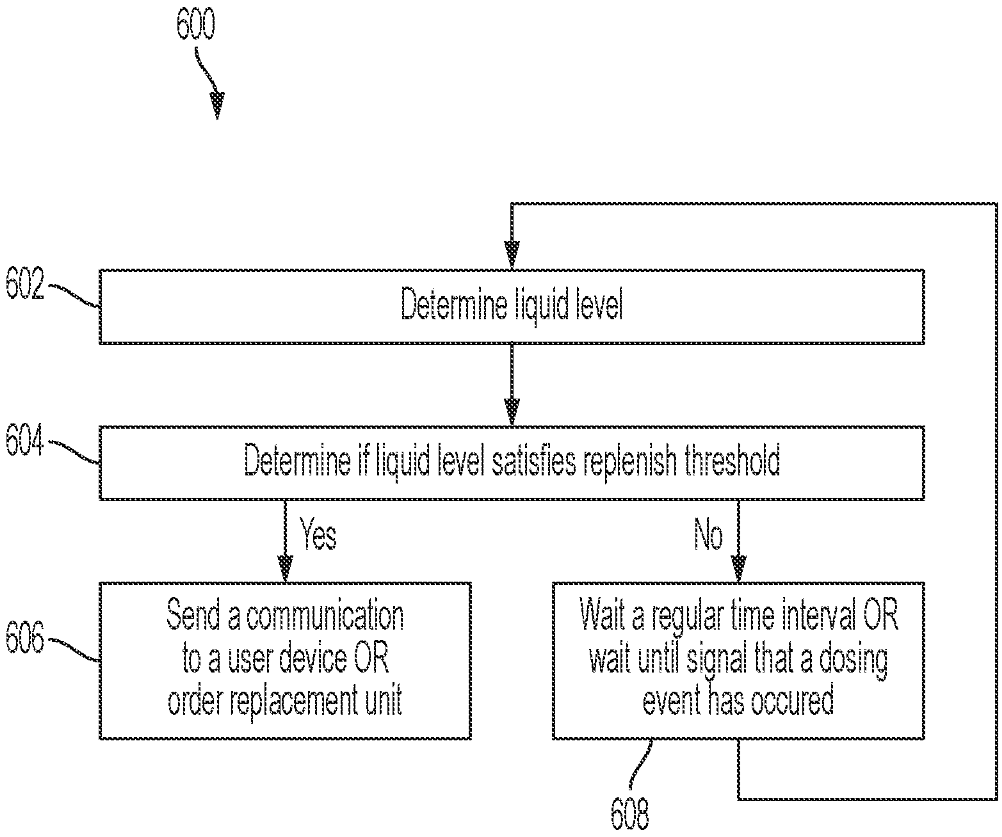
FIG. 2 is a flow chart showing a method for initiating an action based on determining a liquid level according to some embodiments.

The operation of dispensing system 100 will now be discussed in greater detail with reference to FIG. 2. FIG. 2 is a flow chart 600 showing a method for initiating an action based on a determined liquid level according to some embodiments.

In step 602, the level of liquid in container 200 is determined. In some embodiments, signal processing module 500 of dispensing system 100 can determine the level of liquid in container 200 based on sensing data (e.g., a weight, a volume, a capacitance, an intensity of a light signal, or the presence or absence of a light signal) from sensing system 400. In some embodiments, signal processing module 500 can determine the level of liquid in container 200 based on a measurement of container 200 or its contents (e.g., a weight, a volume, or a capacitance). In some embodiments, signal processing module 500 can determine the level of liquid in container 200 based on measurements of the amount of liquid that has been dispensed from container 200. In some such embodiments, for example, signal processing module 500 can determine the level of liquid in container 200 by subtracting an amount of liquid dispensed from container 200 (e.g., from sensing data taken at tap 310, for example, with a sensor) from the original level of liquid in container 200.

In some embodiments, signal processing module 500 can determine the level of liquid in container 200 based on a weight. In some such embodiments, sensing system 400 can be part of holder 300 and can be positioned under container 200 when container 200 is placed in holder 300. For example, sensing system 400 can include a weight sensor (e.g., a load cell) to measure a weight of container 200, its contents, or both. In step 604, signal processing module 500 can determine whether the measured weight indicates that the level of liquid within container 200 is below a replenish threshold.

In some embodiments, signal processing module 500 can determine the level of liquid in container 200 using a proximity sensor or based on ultrasonic waves. In some such embodiments, sensing system 400 can be part of holder 300 and can be positioned under container 200 when container 200 is placed in holder 300. In some such embodiments, sensing system 400 can transmit ultrasonic waves through container 200 and its contents, and can receive reflected waves. In step 604, signal processing module 500 can determine whether the timing of the received reflected waves indicates that the level of liquid within container 200 is below a replenish threshold.

In some embodiments, signal processing module 500 can determine the level of liquid in container 200 based on optical signals. In some such embodiments, sensing system 400 can be part of holder 300 and can be positioned along sides of container 200 when container 200 is placed in holder 300. In some such embodiments, sensing system 400 can transmit light (e.g., in the visible or infrared spectrum) through container 200 and its contents, and can detect the transmitted light. In step 604, signal processing module 500 can determine whether the amount of the light received indicates that the level of liquid within container 200 is below a replenish threshold.

In some embodiments, signal processing module 500 can determine the level of liquid in container 200 based on a measured capacitance. In some such embodiments, sensing system 400 can include a capacitive sensing circuit. A portion of the capacitive sensing circuit can be part of holder 300, and a portion of the capacitive sensing circuit can be part of container 200. Sensing system 400 can measure a capacitance of container 200, its contents, or both. In step 604, signal processing module 500 can determine whether the measured capacitance indicates that the level of liquid within container 200 is below a replenish threshold. Embodiments in which signal processing module 500 can determine the level of liquid in container 200 based on a measured capacitance will be discussed in greater detail below.

In some embodiments, sensing system 400 can be sensitive enough to allow the level of liquid within container 200 to be determined within ±5%, within ±3%, or within ±2%. In some embodiments, sensing system 400 can be sensitive enough to allow the level of liquid within container 200 to be determined within ±5 doses of liquid, within ±2 doses of liquid, or within ±1 dose of liquid. These levels of resolution for the fill level provide a benefit to the end user for tracking use rate to be able to accurately predict when the user will run out of product and place a reorder so that the refill will arrive before the product runs out.

As mentioned, in step 604, it is determined whether the level of liquid in container 200 satisfies a replenish threshold. In some embodiments, signal processing module 500 of dispensing system 100 can determine whether the level of liquid in container 200 satisfies the replenish threshold.

In some embodiments, the replenish threshold can be set by signal processing module 500 based on sensing data acquired over a period of time (e.g., weeks or months). In some embodiments, the replenish threshold can be set by the user (e.g., using an application on a computing device such as a smartphone or laptop in communication with the dispensing system).

In some embodiments, the replenish threshold can be set based on the type of liquid. For example, the replenish threshold can be set higher for liquids that are typically dispensed in larger doses or where there is large variability in the amount of liquid dispensed over a period of time.

In some embodiments, the replenish threshold can be set based on the original volume of liquid in container 200. For example, in some embodiments the replenish threshold is set at approximately 50% of the original liquid volume, at approximately 30% of the original liquid volume, at approximately 10% of the original liquid volume, or at approximately 5% of the original liquid volume. Other thresholds can also be used. Additionally, for example when sending a notification to a user, multiple thresholds can be used. For example, a user can receive a notification (e.g., on an electronic device) at a first replenish threshold (e.g., when there is approximately 50% of the original liquid volume) and at a second replenish threshold (e.g., when there is approximately 10% of the original liquid volume).

In some embodiments, the replenish threshold can be set based on a user's historical use of the liquid. For example, in some embodiments, the replenish threshold can be set to the volume of liquid that the user uses, on average, during one week. As another example, in some embodiments, the replenish threshold can be set to the volume of liquid that the user uses, on average, during two weeks. As another example, in some embodiments, the replenish threshold can be set to the volume of liquid that the user uses, on average, during one day.

In some embodiments, the replenish threshold can be set based on a user's current rate of consumption for the liquid (e.g., the user's rate of consumption over the past day, week, or month). For example, in some embodiments, the replenish threshold can be set to the volume of liquid that the user would consume in one week if the user continued to use the liquid at the user's current rate of consumption. As another example, in some embodiments, the replenish threshold can be set to the volume of liquid that the user would consume in two weeks if the user continued to use the liquid at the user's current rate of consumption. For example, the reorder threshold can be determined by an algorithm that takes into account the individual user's use-up rate and times a reorder to have a refill arrive before the last bit of product in the existing container is used up. Additionally, the user can adjust the threshold to their comfort level, so that for instance they can have a refill arrive one day or one week before they run out, based on their use habits and personal level of comfort about running out of product.

In some embodiments, a user can set the replenish threshold according to the user's preference. For example, dispensing system 100 can include an input device (e.g., an input device on holder 300 or a separate connected input device, e.g., a smartphone) for a user to enter the user's preference.

In step 604, signal processing module 500 of dispensing system 100 can determine that the level of liquid in container 200 satisfies the replenish threshold or that the level of liquid in container 200 does not satisfy the replenish threshold. If signal processing module 500 determines that the level of liquid in container 200 satisfies the replenish threshold, in step 606, dispensing system 100 can send a communication to a user device and/or order a replacement container. In some embodiments, a user can set preferences (e.g., using an input device on holder 300 or a separate connected input device, e.g., a smartphone) for whether a communication is sent, an order is placed, or both, in response to a determination that the level of liquid in container 200 satisfies the replenish threshold. In some embodiments, a user can set preferences for when a communication is sent, an order is placed, or both, in response to a determination that the level of liquid in container 200 satisfies the replenish threshold.

In some embodiments, the communication can be sent to a user's smartphone or other electronic device.

In some embodiments, the communication can indicate that the liquid within container 200 is running low. In some embodiments, the communication can indicate the specific volume of liquid remaining in container 200. In some embodiments, the communication can indicate a predicted amount of time that the remaining liquid within container 200 might last based on the user's historical or current consumption rate.

The communication can, for example, prompt a user to purchase an additional container.

If, in step 604, signal processing module 500 of dispensing system 100 determines that the level of liquid in container 200 does not satisfy the replenish threshold, dispensing system 100 does not send a communication to a user device or order a replacement container. Rather, in step 608, dispensing system 100 waits a period of time before again determining the level of liquid in container 200.

In some embodiments, the period of time for waiting can be a regular time interval (24 hours, 23 hours, 8 hours, 6 hours, or 1 hour). In some embodiments, the period of time for waiting can be until a particular event (e.g., a dosing event or user request) has occurred.

FIGS. 3A-5 show detailed views of embodiments for implementing some features as have been described. The specific structures and mechanisms shown and described (here and anywhere else in this disclosure) may not be the only way to accomplish the functions described, and each element may be implemented using other shapes, structures, and appearances than specifically shown and described.

Figure 3A:
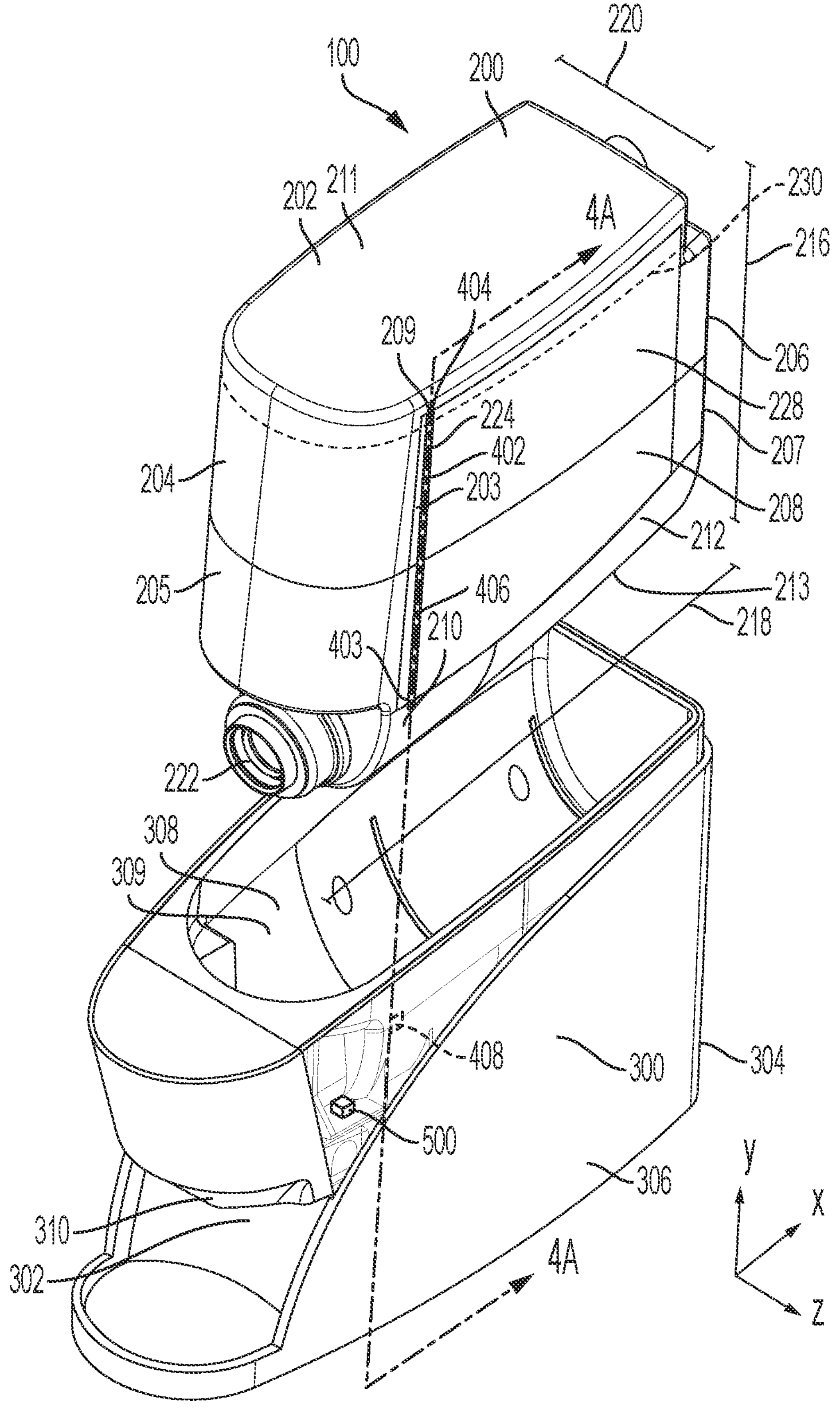
FIG. 3A is a front perspective exploded view of a dispensing system according to some embodiments.
Figure 3B:
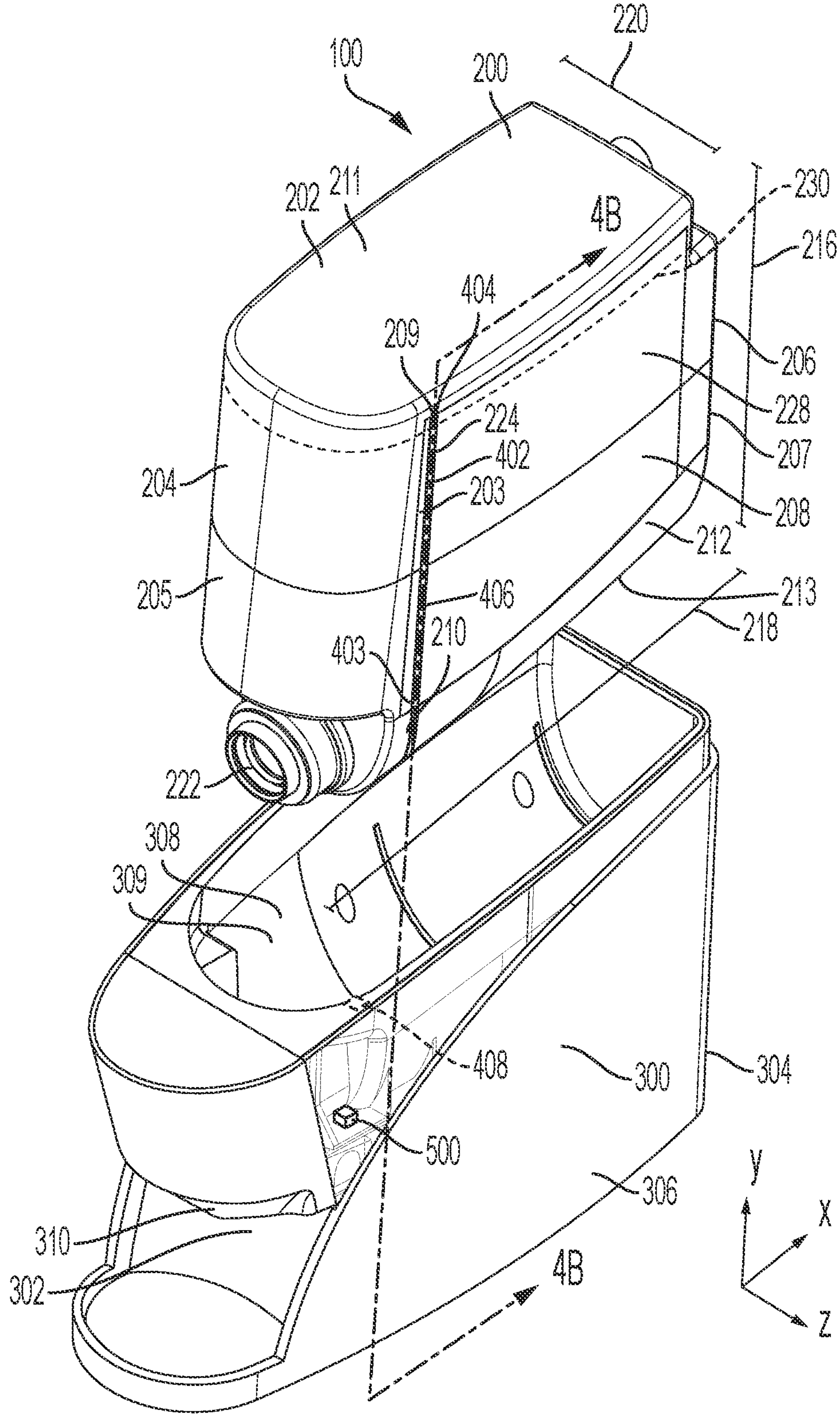
FIG. 3B is a front perspective exploded view of the dispensing system of FIG. 3A, with an alternative conductive strip.

FIGS. 3A and 3B are perspective views of a dispensing system 100 in which signal processing module 500 determines the level of liquid in container 200 based on a measured capacitance. As mentioned, dispensing system 100 can include container 200, holder 300, sensing system 400, and signal processing module 500. As will be discussed in greater detail, sensing system 400 can include a conductive strip 402 coupled to an outer surface of container 200 and an electrical contact 408 coupled to holder 300. FIG. 3A shows conductive strip 402 coupled to container 200, and FIG. 3B shows an alternative conductive strip 402 coupled to container 200.

As shown, for example in FIGS. 3A and 3B, container 200 can include body 202 for holding a liquid 230. Liquid 230 can be any liquid suitable for dispensing from a container. In some embodiments, liquid 230 is a detergent (e.g., laundry detergent). In some embodiments, liquid 230 is a fabric softener. Other suitable liquids (e.g., cleaning products, counter cleaners, toilet cleaners, bath cleaners, soft soaps, dish soaps, hand soaps, face soaps, body washes, hair products (e.g., gels), shampoos, conditioners, or lotions) can be stored in and dispensed from body 202.

Body 202 can define an interior volume 214 of container 200. Body 202 can have any shape suitable for storing a liquid therein. In the illustrated embodiments of FIGS. 3A and 3B, body 202 has a generally rectangular prism shape (e.g., with a curved bottom wall 213 as shown for example in FIG. 4A). However, in other embodiments, body 202 can have another shape (e.g., generally cylindrical). As shown, for example, body 202 can include a front wall 204, a rear wall 206, side walls 208, a top wall 211, and bottom wall 213. The walls can be flat or curved.

In some embodiments, interior volume 214 can have a volume of about 0.5 L to about 8 L (e.g., about 1 L to about 5 L or about 2 L to about 4 L). In some embodiments, interior volume 214 has a volume of about 3 L. In some embodiments, liquid 230 is disposed in interior volume 214.

As shown in FIGS. 3A and 3B, for example, body 202 can have height 216 in the Y-direction, a length 218 in the X-direction, and a width 220 in the Z-direction. In some embodiments, height 216 can be between about 100 mm to about 400 mm (e.g., about 150 mm to about 300 mm or about 200 mm to about 250 mm). In some embodiments, height 216 is about 225 mm. In some embodiments, length 218 can be between about 100 mm to about 400 mm (e.g., about 125 mm to about 300 mm or about 150 mm to about 250 mm). In some embodiments, length 218 is about 200 mm. In some embodiments, width 220 is about 50 mm to about 200 mm (e.g., about 60 mm to about 150 mm or about 80 mm to about 100 mm). In some embodiments, width 220 is about 90 mm.

In some embodiments, body 202 defines a dispensing opening 222. Dispensing opening 222 can be disposed near a bottom of container 200 such that liquid stored in container 200 flows by gravity to dispensing opening 222 when container 200 is in an upright position.

In some embodiments, conductive strip 402 is coupled to an outer surface 203 of container body 202 at a coupling portion 224 of container body 202. Conductive strip 402 can be or include a conductive plate of a capacitive sensing circuit. In some embodiments, conductive strip 402 includes a lead wire or other electrical connector to electrically connect conductive strip 402 to another electronic component.

In some embodiments, a product label 228 is affixed to an outer surface of container body 202 and can obscure or partially obscure conductive strip 402 from view. For example, in some embodiments, conductive strip 402 can be disposed under product label 228 and product label 228 can be affixed to container body 202 over conductive strip 402. In other embodiments, conductive strip 402 can be integrally formed with product label 228, and product label 228 (with conductive strip 402) can be affixed to an outer surface of container body 202.

As shown, for example, in FIG. 3A, in some embodiments, conductive strip 402 can extend from (or near) a top of container body 202 to (or near) a bottom of container body 202. For example, an upper portion 404 of conductive strip 402 can be disposed on an upper side wall portion 209, and a lower portion 406 of conductive strip 402 can be disposed on a lower side wall portion 210 of container body 202. As another example, as shown in FIG. 3B, an upper portion 404 of conductive strip 402 can be disposed on an upper side wall portion 209, and a lower portion 406 of conductive strip 402 can be disposed on a bottom wall portion 213 of container body 202. As used herein, an upper portion refers to a portion that is disposed above a midline, and a lower portion refers to a portion that is disposed below a midline when container 200 is disposed in holder 300 during use.

As shown, for example, in FIG. 3B, in some embodiments, conductive strip 402 can extend to or nearly to a lowest point of container body 202. This can, for example, allow sensing system 400 to resolve liquid levels for the entire (or nearly the entire) volume of container 200.

As also shown, for example, in FIG. 3B, in some embodiments, conductive strip 402 can extend lower than at least a portion of dispensing opening 222. This can, for example, allow sensing system 400 to resolve liquid levels for the entire (or nearly the entire) volume of container 200.

In some embodiments, coupling portion 224 (the portion of container body 202 coupled to conductive strip 402) forms a smooth curve. That is, coupling portion 224 forms a differentiable curve. This can, for example, allow for better adhesion of conductive strip 402 to container body 202. Alternatively or additionally, the smooth curve of coupling portion 224 can allow for better adhesion of product label 228 to container body 202 over conductive strip 402. In some embodiments, upper side wall portion 209 and lower side wall portion 210 can together form a smooth curve. The smooth curve of upper side wall portion 209 and lower side wall portion 210 can allow for better adhesion of product label 228 to container body 202 (over conductive strip 402 or integrally with conductive strip 402).

In some embodiments, dispensing opening 222 can be disposed at a front portion 205 of container body 202, and a lower portion 212 of body 202 can be angled downward from a rear portion 207 of body 202 toward a front portion 205 of body 202 and toward dispensing opening 222. This can, for example, allow liquid 230 to be more easily dispensed through dispensing opening 222. In some such embodiments, conductive strip 402 can be disposed at a front portion 205 of body 202 proximate dispensing opening 222. This can, for example, allow sensing system 400 to sense a fuller range of liquid within container 200 (e.g., due to the presence of liquid in the front portion 205 of container but not at a rear portion 207 of container 200 at low liquid levels).

As shown, for example, in FIGS. 3A-3B, dispensing system 100 can also include holder 300. Holder 300 can have any shape suitable for receiving and holding container 200. As shown in FIGS. 3A-3B, for example, holder 300 can include a front wall 302, a rear wall 304, and side walls 306.

In FIGS. 3A-3B, holder 300 is configured to rest on a flat surface. However, in some embodiments, holder 300 can be configured to be mounted to a wall or other surface. In some embodiments, holder 300 can be configured to be placed at an edge of a horizontal surface (e.g., a counter, shelf ledge, or sink edge) with tap 310 extending past the edge of the horizontal surface.

As also shown in FIGS. 3A-3B, holder 300 can include a receiving portion 308. Receiving portion 308 can have a shape which complements a shape of container body 202 such that an upper surface 309 of receiving portion 308 contacts a lower portion 212 of body 202 when body 202 is disposed in receiving portion 308. For example, as shown in FIGS. 1, 3A-3B, and 4A-4B, container body 202 can have a curved lower surface 232 and receiving portion 308 can have a corresponding curved upper surface 309. When body 202 is disposed in receiving portion 308, an upper surface 309 of receiving portion 308 can contact lower surface 232 of body 202.

In some embodiments (for example, as shown in FIG. 3A), when container body 202 is placed in receiving portion 308, front wall 302, rear wall 304, and/or side walls 306 of holder 300 can extend around a lower portion 212 of container body 202. This can, for example, help keep container 200 in a stable position relative to holder 300 or hide portions of container 200 from a user's view. In some embodiments, placing container body 202 in receiving portion 308 can create an interference fit to secure container body 202 in receiving portion 308 of holder 300.

In some embodiments, body 202 of container 200 and holder 300 are shaped such that container 200 can be placed in holder 300 in only a single orientation. For example, as illustrated in FIGS. 3A and 3B, container 200 can be placed onto holder 300 only in its upright position. This can, for example, help place container 200 at a particular position (e.g., location and/or angle) so that, for example, the level of liquid in container 200 can be accurately measured. This can also help place container 200 at a particular position so that, for example, an electrical connection can be made between components of sensing system 400, as will be discussed. In some embodiments, container 200 and/or holder 300 can include orientation features to orient container 200 in a particular orientation relative to holder 300. For example, container 200 can include a projection to be received within a receptacle of holder 300 (or vice versa) to orient container 200 relative to holder 300.

In some embodiments, sensing system 400 can include an electrical contact 408 disposed on holder 300, as shown for example in FIGS. 3A-3B. Electrical contact 408 can be configured to contact conductive strip 402 (e.g., at contact surface 403 of conductive strip 402) when container 200 is received in holder 300. When conductive strip 402 and electrical contact 408 are electrically connected, conductive strip 402, electrical contact 408, and electrically connected circuitry can form a capacitive sensing circuit. Sensing system 400 (including conductive strip 402 and electrical contact 408) can then sense a capacitance of container 200, its contents, or both.

Electrical contact 408 can also be in electrical communication (wired or wireless) with signal processing module 500. Accordingly, signal processing module 500 can receive capacitance signals from sensing system 400 to determine a liquid level in container 200, as previously described. Signal processing module 500 can determine, based on the level of liquid within container 200, whether a replenish threshold has been satisfied, as described above. If the replenish threshold has been satisfied, signal processing module 500 can send a communication to a user device (e.g., smartphone) and/or order a replacement container, as previously described. If the replenish threshold has not been satisfied, signal processing module 500 can wait a period of time before again determining the level of liquid in container 200, as described above.

Figure 4A:
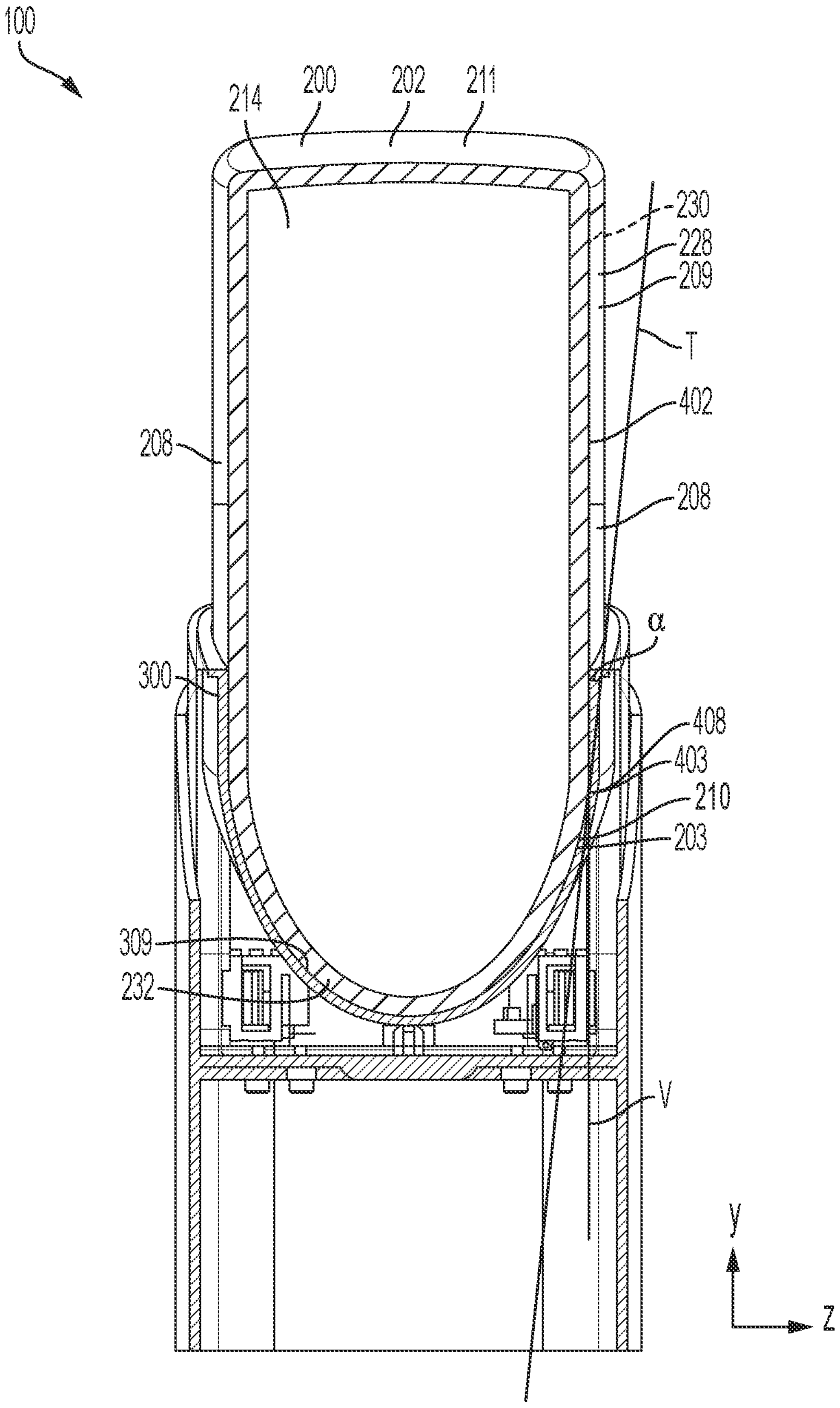
FIG. 4A is a cross-section of the dispensing system of FIG. 3A, with the container disposed in the holder, taken along line 4A-4A of FIG. 3A.
Figure 4B:
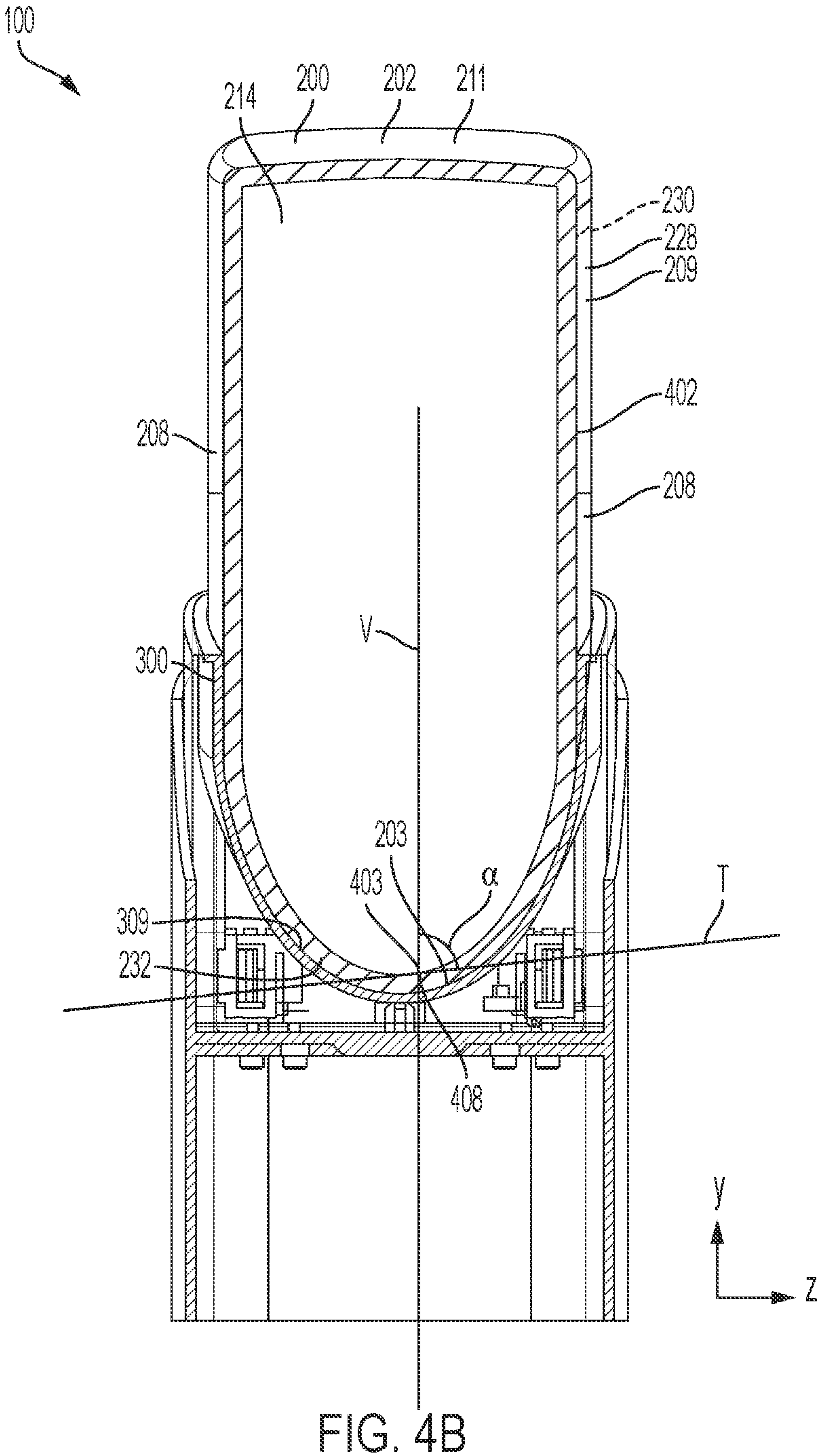
FIG. 4B is a cross-section of the dispensing system of FIG. 3B, with the container disposed in the holder, taken along line 4B-4B of FIG. 3B.

In FIGS. 4A and 4B, container 200 is shown received in holder 300. As mentioned, when container 200 is received in holder 300, conductive strip 402 disposed on container 200 contacts electrical contact 408 disposed on holder 300. FIGS. 4A-4B are cross-sectional views showing relative positions of these and other components when container 200 is received in holder 300.

As shown, for example, in FIGS. 4A-4B, electrical contact 408 and contact surface 403 of conductive strip 402 are disposed at an angle $\alpha$ relative to vertical (i.e., relative to gravity in the y-direction). This arrangement can, for example, help provide for a more reliable contact between electrical contact 408 and contact surface 403 of conductive strip 402 (e.g., due to sliding engagement of electrical contact 408 and contact surface 403 as container 200 is placed in holder 300).

In some embodiments, for example, as shown in FIGS. 4A-4B, a plane T tangent to outer surface 203 of container 200 at contact surface 403 can intersect a vertical plane V at an angle α of about 5 degrees to about 89 degrees, at an angle α of about 45 degrees to about 80 degrees, or at an angle α of about 85 degrees to about 87 degrees. An intersection angle α of about 45 degrees to about 80 degrees can, for example, provide for a sliding contact between electrical contact 408 and contact surface 403 that has a large vertical component. An intersection angle α of about 85 degrees to about 87 degrees can, for example, allow contact surface 403 to slide into contact with electric contact 408 when container 200 is placed into holder 300, while also allowing container 200 to have relatively parallel sides. This can, for example, help provide for a more reliable contact between electrical contact 408 and contact surface 403 of conductive strip 402.

Figure 5:
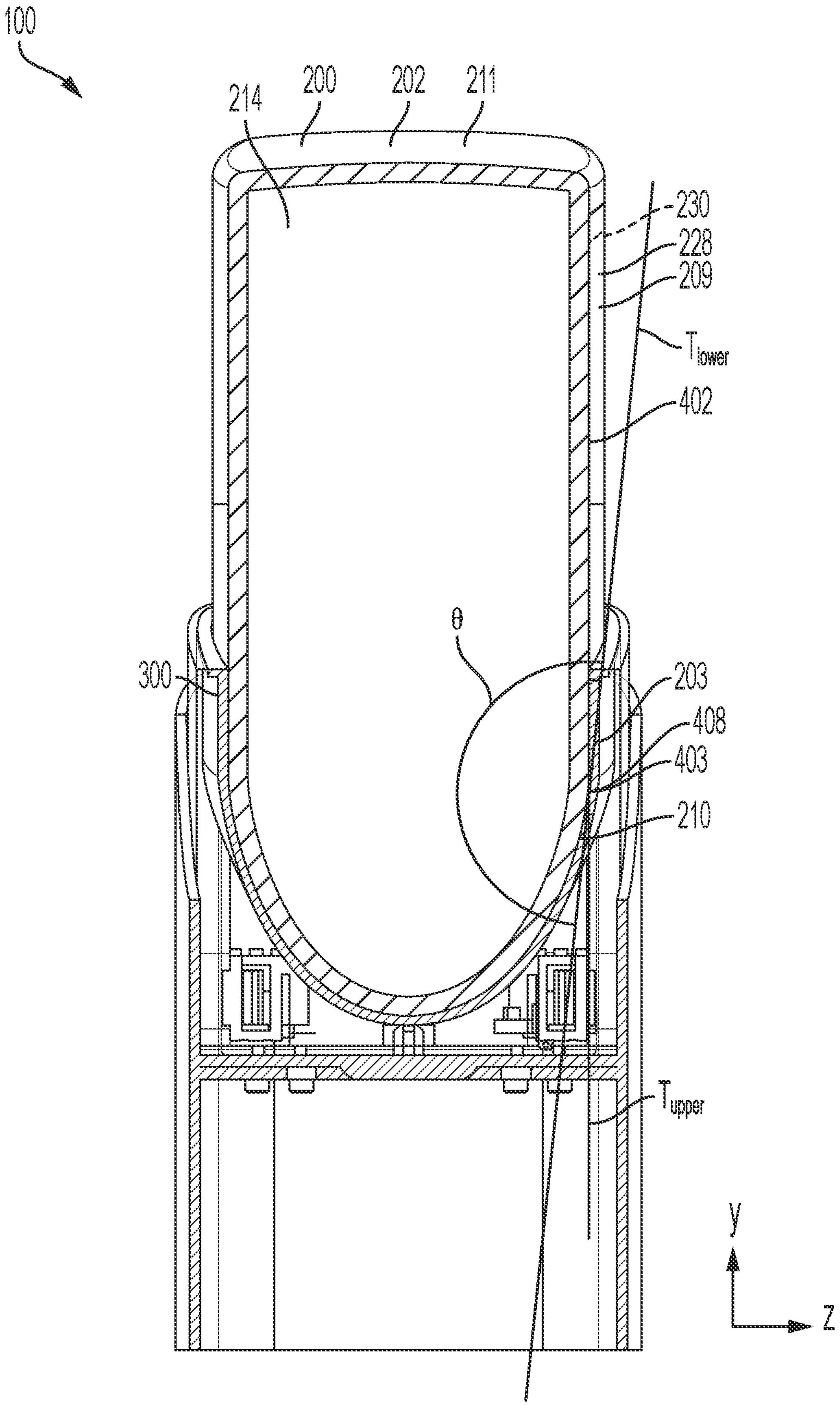
FIG. 5 is a cross-section of the dispensing system of FIG. 3A, with the container disposed in the holder, taken along line 4A-4A of FIG. 3A.
Figure 6:
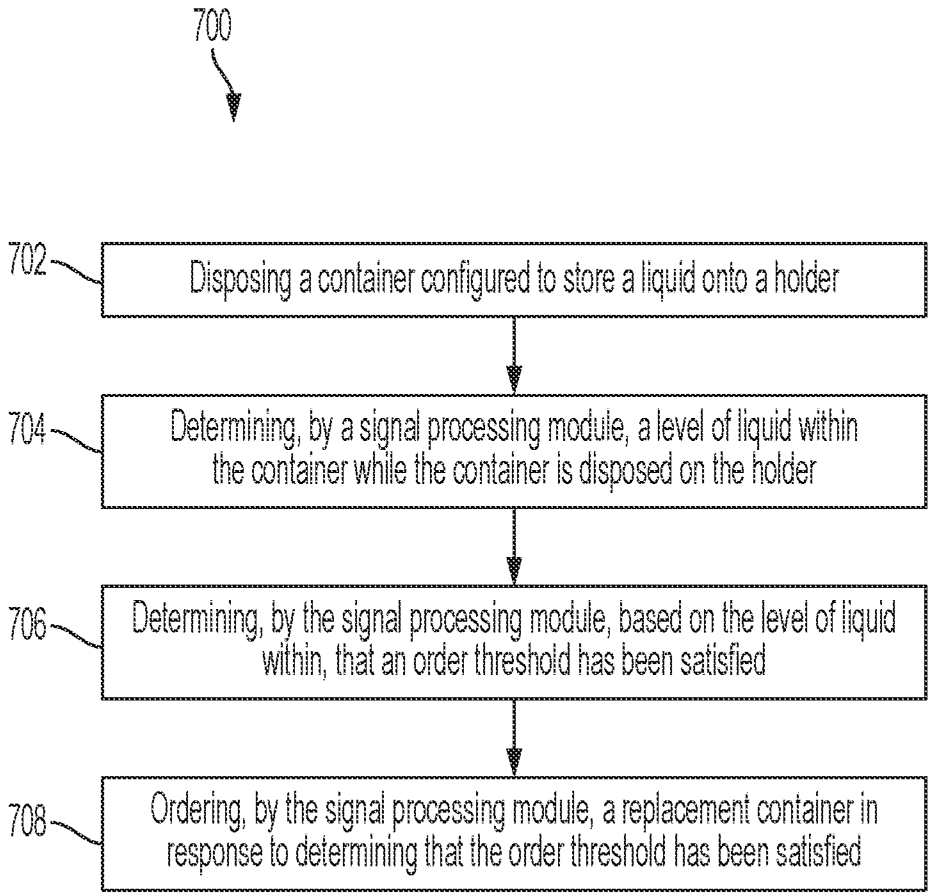
FIG. 6 shows a method for initiating an action based on sensing a liquid level according to some embodiments.

As mentioned in some embodiments, an upper portion 404 of conductive strip 402 can be disposed on an upper side wall portion 209, and a lower portion 406 of conductive strip 402 can be disposed on a lower side wall portion 210 of body 202. In some such embodiments, for example as shown in FIG. 5, lower side wall portion 210 is disposed at an angle θ of about 170 degrees to about 179 degrees relative to the upper side wall portion 209, or at angle θ of about 175 degrees to about 177 degrees relative to the upper side wall portion 209. For example, a plane $T_{upper}$ tangent to upper side wall portion 209 can intersect a plane $T_{lower}$ tangent to lower side wall portion 210 at an angle θ of about 170 degrees to about 179 degrees, or at angle θ of about 175 degrees to about 177 degrees. This configuration can, for example, provide for a sliding contact between electrical contact 408 and contact surface 403 while allowing container 200 to have relatively parallel sides As disclosed herein, dispensing system 100 can be used to initiate an action based on liquid-level sensing. FIG. 6 illustrates a method 700 for initiating an action based on liquid-level sensing according to some embodiments.

In step 702, container 200 is disposed onto holder 300. In some embodiments, container 200 is disposed onto holder 300 by lowering container 200 onto holder 300. In some embodiments, container 200 is disposed onto holder 300 without rotating container 200 or holder 300. In some embodiments, container 200 can releasably attach to holder 300 when disposed onto holder 300. For example, container 200 can releasably attach to holder 300 via a friction-fit connection or a snap-fit connection.

In step 704, signal processing module 500 determines a level of liquid within container 200 in any of the ways described above while container 200 is disposed on holder 300.

In step 706, signal processing module 500 determines, based on the level of liquid within container 200, whether a replenish threshold has been satisfied, as described above.

In step 708, signal processing module 500 communicates that the replenish threshold has been satisfied in response to determining that the replenish threshold has been satisfied. For example, in some embodiments, signal processing module 500 can order a replacement container. As another example, in some embodiments, signal processing module 500 can send a notification to a user device. In some embodiments, signal processing module 500 can order a replacement container and send a notification to a user device.

As used herein, the terms "upper" and "lower," "top" and "bottom," "front" and "rear," "inner" and "outer," and the like are intended to assist in understanding of embodiments of the disclosure with reference to the accompanying drawings with respect to the orientation of the dispensing system as shown. The directional terms are used for convenience of description and it is understood that embodiments disclosed herein can be positioned in any of various orientations.

The term "about" or "substantially" or "approximately" as used herein refer to a considerable degree or extent. When used in conjunction with, for example, an event, circumstance, characteristic, or property, the term "about" or "substantially" or "approximately" can indicate a value of a given quantity that varies within, for example, 1-15% of the value (e.g., ±1%, ±2%, ±5%, ±10%, or ±15% of the value), such as accounting for typical tolerance levels or variability of the embodiments described herein.

It is to be appreciated that the Detailed Description section, and not any other section, is intended to be used to interpret the claims. Other sections may set forth one or more but not all embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The above examples are illustrative, but not limiting, of the present disclosure. Other suitable modifications and adaptations of the variety of conditions and parameters normally encountered in the field, and which would be apparent to those skilled in the art, are within the spirit and scope of the disclosure.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The breadth and scope of the present disclosure should not be limited by any of the above-described embodiments, but should be defined only in accordance with the claims and their equivalents.

What is claimed is:

1. A dispensing system comprising:

a container comprising:

a body configured to store a liquid, and a conductive strip coupled to an outer surface of the body;

a holder configured to receive the container, the holder comprising an electrical contact configured to contact the conductive strip when the container is received in the holder; and a signal processing module in electrical communication with the electrical contact, the signal processing module configured to receive signals from the electrical contact to determine a level of liquid within the container body based on the signals when the container is received in the holder, wherein the signal processing module is configured to determine the level of liquid within the container in response to determining that a dosing event has occurred.

2. The dispensing system of claim 1, wherein a contact surface of the conductive strip contacts the electrical contact of the holder when the container is received in the holder, and wherein a plane tangent to the outer surface of the container at the contact surface intersects a vertical plane at an angle of between about 5 degrees and about 89 degrees.

3. The dispensing system of claim 1, wherein the holder comprises a tap configured to dispense the liquid from the container.

4. The dispensing system of claim 1, wherein the signal processing module is configured to communicate the level of liquid within the container to a user.

5. The dispensing system of claim 1, wherein the signal processing module is configured to determine, based on the level of liquid within the container, that a replenish threshold has been satisfied.

6. The dispensing system of claim 5, wherein the signal processing module is configured to determine that the replenish threshold has been satisfied based on the level of liquid within the container by first determining a volume of liquid remaining in the container.

7. The dispensing system of claim 5, wherein the signal processing module is configured to automatically order a replacement container in response to determining that the replenish threshold has been satisfied.

8. The dispensing system of claim 5, wherein the signal processing module is configured to automatically send a communication to a user device in response to determining that the replenish threshold has been satisfied.

9. The dispensing system of claim 1, wherein the signal processing module is configured to determine the level of liquid within the container at a regular time interval.

10. The dispensing system of claim 1, wherein the conductive strip is integrally formed with a product label coupled to the outer surface of the container.

11. The dispensing system of claim 1, wherein the conductive strip is disposed under a product label coupled to the outer surface of the container.

12. A container comprising:

a body configured to store a liquid, the body comprising:

an outer surface, an upper portion comprising an upper side wall portion, and a lower portion comprising a dispensing opening and a lower side wall portion disposed at an angle of about 170 degrees to about 179 degrees relative to the upper side wall portion; and a conductive strip coupled to the outer surface of the body, wherein an upper portion of the conductive strip is disposed on the upper side wall portion, and wherein a lower portion of the conductive strip is disposed on the lower side wall portion.

13. The container of claim 12, wherein the lower side wall portion is disposed at an angle of about 175 degrees to about 177 degrees relative to the upper side wall portion.

14. The container of claim 12, wherein the upper side wall portion and the lower side wall portion together form a smooth curve.

15. The container of claim 12, wherein the conductive strip is coupled to the outer surface of the body along a coupling portion of the body, and wherein the coupling portion of the body forms a smooth curve.

16. The container of claim 12, wherein the dispensing opening is disposed at a front portion of the body, and wherein the lower portion of the body is angled downward from a rear portion of the body toward the front portion of the body and toward the dispensing opening.

17. A method of dispensing a liquid, the method comprising:

disposing a container configured to store a liquid onto a holder, wherein a conductive strip coupled to an outer surface of the container contacts an electric contact disposed on the holder;

determining, by a signal processing module, a level of liquid within the container at a regular time interval while the container is disposed on the holder;

determining, by the signal processing module, based on the level of liquid within the container, that a replenish threshold has been satisfied; and communicating, by the signal processing module, in response to determining that the replenish threshold has been satisfied, that the replenish threshold has been satisfied.

18. The method of claim 17, wherein communicating that the replenish threshold has been satisfied comprises ordering a replacement container.

19. The method of claim 17, wherein communicating that the replenish threshold has been satisfied comprises sending a notification to a user device.

* * * * *